3,344,066
SILICONE GREASES OF HIGH MECHANICAL
AND THERMAL STABILITY
Harry M. Schiefer, John W. Vandyke, and John S. Delphenich, Midland, Mich., assignors to Dow Corning Corporation, Midland Mich., a corporation of Michigan
No Drawing. Filed Apr. 14, 1966, Ser. No. 542,459
9 Claims. (Cl. 252—28)

ABSTRACT OF THE DISCLOSURE

A silicone grease, the utility of which lies in a three component system for high speed bearing performance, thermal and mechanical stability; said system consisting essentially of (a) silicone fluid, (b+c) hydrophobic silica, and (d) hydroxylated siloxane fluid. An illustrative example of the grease formulation would be (a) trimethylsiloxy-endblocked copolymer consisting of dimethylsiloxane units and phenylmethylsiloxane units, (b) powdered silica treated by (c) sym-trimethyltriphenylcyclotrisiloxane, and (d) phenylmethylpolysiloxane having 4.9 weight percent hydroxyl content.

---

This application, which is a continuation-in-part of U.S. application Ser. No. 447,055, filed Apr. 9, 1965 and now abandoned, relates to greases and lubricating compounds which possess stable physical properties, even when subjected to extremes of temperature and working conditions.

Greases which are made from organopolysiloxane fluids and powdered silica thickeners are well-known.

It is the unexpected discovery of this invention that the addition of a fluid, hydroxylated organopolysiloxane plus a strongly hydrophobic, treated silica to a silicone fluid results in a grease having a significant increase in mechanical and thermal stability when compared with previously known silicone-containing greases. Many of the greases of this invention are particularly useful as lubricants for high speed bearings.

More specifically, this application relates to a grease consisting essentially of (a) 100 parts by weight of an organopolysiloxane fluid of the average unit formula $R_nSiO_{4-n/2}$ where R is selected from the group consisting of monovalent hydrocarbon and haloaryl radicals of no more than 7 carbon atoms, free of aliphatic unsaturation, $n$ has an average value of 1.9 to 2.1, the viscosity of (a) being from 20 to 30,000 cs. at 25° C.; (b) from 5 to 25 parts of a powdered silica filler having a surface area of at least 100 square meters per gram, which filler is rendered hydrophobic by treatment with (c) from 2 to 150 weight percent, based on the weight of (b), of a compound selected from the group consisting of cyclic poysiloxanes of the formula $(R'_2SiO)_3$, at least 50 mol percent of said R' groups being methyl; silazanes of the formula $$(R'_3Si)_aNH_{3-a}$$

where $a$ has a value of 1 to 2; polysilazanes of the unit formula

which have a viscosity of no more than 200 cs. at 25° C., and silanes of the formula $R'_bSiX_{4-b}$, where X is chlorine, bromine, lower alkoxy, lower acyloxy, or hydroxyl, $b$ has a value of 2 to 3, and R' is in all cases as defined below; and (d) from 5 to 100 weight percent, based on the weight of (b), of a hydroxylated organopolysiloxane fluid containing an average of 1.8 to 2.1 R' groups per silicon atom where R' is selected from the group consisting of monovalent hydrocarbon and halohydrocarbon radicals of no more than 7 carbon atoms, said fluid having a silicon-bonded hydroxyl content of at least 1 weight percent.

Ingredients (a), (b), (c), and (d) can in themselves be mixtures, if desired.

X can be any lower alkoxy radical such as methoxy, ethoxy or isobutoxy; or any lower acyloxy radical such as acetate or propionate.

R can be any monovalent hydrocarbon radical, free of aliphatic unsaturation, of no more than 7 carbon atoms, e.g. alkyl and cycloalkyl radicals such as methyl, ethyl, isopropyl, cyclopentyl, 2-ethylpentyl and dodecyl; and aryl radicals such as phenyl, xenyl, benzyl, and tolyl. R can also be any monovalent haloaryl radical such as chlorophenyl, dibromophenyl, and α,α,α-trifluorotolyl.

R' can be any of the above examples of R, as well as any haloalkyl or halocycloalkyl radical such as β-chloroethyl, 3,3,3-trifluoropropyl, bromoisobutyl, chloroallyl and dichlorocyclohexyl, as well as aliphatically unsaturated radicals such as ethynyl, allyl or cyclohexenyl.

It is preferred for R to be both methyl and phenyl. Preferred ingredients (c) are sym-trimethyltriphenylcyclotrisiloxane and hexamethyldisilazane, and a preferred ingredient (d) is a hydroxylated fluid consisting primarily of phenylmethylsiloxane units.

Ingredient (a) preferably has a viscosity of 50 to 8000 cs. at 25° C. For high speed bearing greases, the preferred maximum viscosity of (a) is 1500 cs., but higher viscosities are desirable for other uses where tacky, strongly adhering, wash-resistant greases are desired. It is frequently desirable for 5 to 15 percent of its R groups to be phenyl and the remainder methyl.

Ingredient (b) is preferably a nonstructured silica, i.e. consisting of discrete, roughly spherical particles rather than chains of particles adhering one to the other.

When (c) is a cyclotrisiloxane, the greases of this invention can be made by simply combining ingredients (a) through (d) in their proper proportions, preferably in the presence of from 0.2 to 10 mol percent, based on the moles of (b), of (e) a catalyst selected from the group consisting of ammonium hydroxide, ammonium carbonate, $NH_4X$,

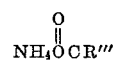

$NR''_3$, and combinations thereof, where X is selected from the group consisting of chlorine and fluorine, R''' is selected from the group consisting of hydrogen, methyl, and ethyl, and R'' is selected from the group consisting of hydrogen and monovalent hydrocarbon radicals that have their valence bonds on an aliphatic carbon atom.

R'' can be any monovalent hydrocarbon radical as described above, e.g., methyl, isopropyl, hexyl, octadecyl, benzyl, or 2-phenylpropyl.

The preferred ingredient (e) is ammonium carbonate or ammonia. Other examples of ingredient (e) are ammonium fluoride, ammonium formate, ammonium acetate, butylamine, diisopropylamine, trimethylamine, benzyldecylamine, and cyclohexyloctadecylamine.

When (c) is a silazane, polysilazane, chlorosilane, bromosilane, or acyloxysilane, the ingredients can simply be mixed without a catalyst to obtain the improved greases of this invention. Heat treatment is often desirable to obtain the best properties.

When (c) is a silanol or an alkoxysilane, a trace of a known silanol condensation catalyst should preferably be added to the newly-formed grease while mixing, e.g. dibutyltindilaurate, tetrabutyltitanate, stannous octoate, guanidine octoate, or the catalysts listed above as ingredient (e). The mixture should also be heat-treated.

Optimum results are often obtained when ingredient (b), the silica filler, is treated with ingredients (c), (d), and, if present, ingredient (e) before mixing with ingredient (a), the silicone fluid. This can be done by mixing ingredients (b) through (e) together in a volatile organic solvent dispersion, e.g., toluene, diethyleneglycoldimethylether, octane, or chlorobenzene, and then evaporating the solvent dispersing agent, or simply by mixing the ingredients themselves without a dispersing agent. Also, if desired, ingredient (d), the hydroxylated silicone fluid, can be added along with ingredient (a) to the other ingredients rather than being added first to the silica.

Generally, when the silica ingredient is being treated before the addition of ingredient (a), a few hours or days are allowed for the treatment to take effect before adding ingredient (a). The effect of the treatment is to render the surface of the silica hydrophobic.

Likewise, a volatile organic solvent can be used as a dispersing agent during the mixing of all of the ingredients.

Specific examples of ingredients (c) which are operative in this invention are

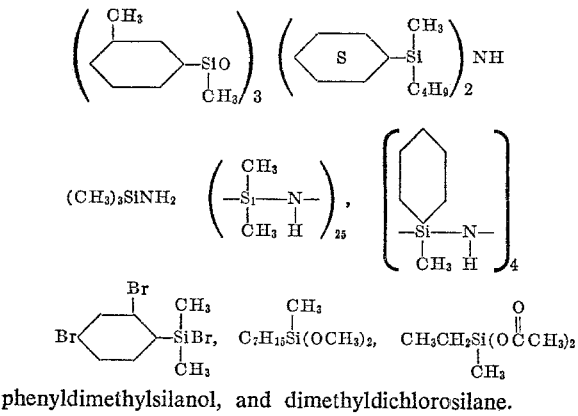

phenyldimethylsilanol, and dimethyldichlorosilane.

Example 1

To 10 parts by weight of a powdered silica having a surface area of about 200 square meters per gram there was added 200 parts of chlorothene as a dispersing agent, 3.2 parts of a phenylmethylsiloxane fluid having approximately a 6 weight per cent hydroxyl content, 0.5 part of sym-trimethyltriphenylcyclotrisiloxane, 0.3 part of other cyclic and linear phenylmethylsiloxanes which were impurities in the ingredients, and two parts of ammonium carbonate.

This was heated at reflux to 150° C. for 5 to 10 minutes. Then 100 parts by weight of a trimethylsiloxy-endblocked copolymer consisting of 92.5 mol percent of dimethylsiloxane units and 7.5 mol percent of phenylmethylsiloxane units, having a viscosity of 100 cs. at 25° C., were added, and the chlorothene was removed under vacuum.

The product was a grease. It was tested for consistency by the test described in ASTM 1403–56T, converted as therein described to the full-scale cone penetration of ASTM D217–52T. Briefly, this test measures the depth that a cone-shaped weight sinks into the grease. Low "penetration" values therefore indicate a thick grease, and high values indicate a thin grease. A penetration of over 400 indicates that the material is more souplike than greaselike, whereas a penetration of less than 100 indicates that the grease is too thick to be normally used.

Penetrations were measured before and after "working" the grease by forcing it through a metal plate with one millimeter holes, performed by moving the plate through the grease. The working test consists of 60 one-second strokes of the plate.

The bleed and evaporation rates of the grease were measured in terms of weight loss of the grease.

The results were:

| Grease | Penetration | | Penetration after 24 hrs. at 400° F. | | Bleed after 30 hrs. at 400° F. (percent) | Evaporation after 22 hrs. at 400° F. (percent) |
| --- | --- | --- | --- | --- | --- | --- |
| | Unworked | Worked | Unworked | Worked | | |
| (a) The above grease | 279 | 297 | 249 | 286 | 9.22 | 2.5–18 |
| (b) A commercial soap-thickened silicone grease | 283 | 297 | 95 | 219 | 5–10 | 10 |

It is preferred for ingredient (d) to be incompatible with ingredient (a). The best bearing performance is obtained under those circumstances.

The term "incompatible" is defined to mean the following: if 2 parts by weight of a given ingredient (d) cannot dissolve in 10 parts by weight of an ingredient (a) to form a one phase solution rather than an emulsion or a suspension, that ingredient (d) is incompatible with that ingredient (a). They are compatible if they are miscible in these proportions.

When ingredient (d) is compatible with ingredient (a), greases with high mechanical stability result, but their mechanical stability at high temperatures is generally insufficient for them to exhibit superior performance in high speed bearings.

Other additives such as corrosion and oxidation inhibitors, dyes, bleed reducing agents, etc. can be added to the compositions of this invention without departing from the scope of the claims.

The greases of this invention tend to have higher extrudability than other silicone greases of similar physical consistency.

The following examples are illustrative only and should not be construed as limiting the invention which is properly delineated in the appended claims.

The above two greases were tested in an M.R.C. S–17, size 204 bearing in accordance with Federal Standard 791, Method 333. The bearing was run at 10,000 r.p.m. under a load of 5 lbs. and a temperature of 450° F.

The bearing with grease (a) ran for over 1000 hours without failing, while the bearing with grease (b) failed in less than 24 hours.

Example 2

(a) Another batch of grease was made by the method of Example 1, except that hexane was used in place of chlorothene as the dispersing agent.

(b) A grease was made in the following manner: to 100 parts by weight of a powdered silica having a surface area of 400 square meters per gram, there was added 27.5 parts of sym-trimethyltriphenylcyclotrisiloxane and one part of ammonium carbonate. This was rolled at room temperature for 5 days, and then heated at 150° C. under vacuum to remove all remaining ammonia. A hydrophobic silica was recovered.

To 18.1 parts by weight of the above treated silica there was added 81.9 parts of a trimethylsiloxy-endblocked polysiloxane copolymer consisting of 92.5 mol percent of dimethylsiloxane units and 7.5 mol percent of phenylmethylsiloxane units, having a viscosity of 1000 cs. at 25° C.

(c) To 9 parts by weight of a powdered silica having a surface area of 200 square meters per gram there was added 100 parts of a blend of dimethylpolysiloxane fluids, the blend having a viscosity of 6000 cs. at 25° C. This was milled until a grease was formed.

These greases were tested as in Example 1:

| Grease | Penetration | | Penetration after 24 hrs. at 400° F. | | Bleed after 30 hrs. at 400° F. (percent) | Evaporation after 22 hrs. at 400° F. (percent) |
|---|---|---|---|---|---|---|
| | Unworked | Worked | Unworked | Worked | | |
| Sample (a) | 279 | 290 | 272 | 286 | 12.7 | 1.25 |
| Sample (b) | 256 | >400 | | | | |
| Sample (c) | 212 | >400 | | | | |

A fourth grease (d) was prepared from 86.5 weight percent of a dimethylpolysiloxane fluid with a viscosity of about 500 cs. at 25° C., 10.3 percent of powdered silica filler with a surface area of over 100 m.$^2$/gm., 2.7 percent of a hydroxylated methylpolysiloxane fluid, having a hydroxyl content of about 4 weight percent, 0.36 percent of boric acid and 0.14 percent of pentaerythritol, the latter two ingredients being known silicone grease stabilizers.

Grease (d), and grease (a), were both tested in the bearing test of Example 1.

The bearing with grease (a) operated for over 1040 hours without failing, while the bearing with grease (d) failed in less than 24 hours.

Grease (a) is within the scope of the claims of this application. Greases (b), (c), and (d) are outside of the scope of the claims of this application, being included to show the superiority of grease (a).

*Example 3*

(a) To 14.4 parts by weight of the treated silica of Example 2(b) there was added 84.4 parts by weight of a trimethylsiloxy endblocked copolymer consisting of 92.5 mol percent of dimethylsiloxane units and 7.5 mol percent of phenylmethylsiloxane units, having a viscosity of 1000 cs. at 25° C., plus 1.1 parts of a phenylmethylpolysiloxane fluid having a 4.9 weight percent hydroxyl content. The milled composition was a grease.

(b) To 13.7 parts by weight of the treated silica of Example 2(b) there was added 84.2 parts of the polysiloxane copolymer of (a) above and 2.0 parts of the hydroxylated polysiloxane fluid of (a) above. A grease was formed on milling.

(c) To 49 g. of powdered silica having a surface area of 400 square meters per gram there was added about 16 g. of a phenylmethylpolysiloxane fluid having a hydroxyl content of about 6 weight percent, 2 g. of sym-triphenyltrimethylcyclotrisiloxane, about 1.6 g. of other cyclic and linear phenylmethylsiloxane polymers which were added as impurities and 1 g. of ammonium carbonate. This mixture was rolled and heated at 50° C. for 44 hours. The mixture was then heated at 150° C. in a vacuum to remove all ammonia.

To 17.7 parts by weight of the above treated silica there was added 82.3 parts of a trimethylsiloxy endblocked copolymer consisting of 92.5 mol percent of dimethylsiloxane units and 7.5 mol percent of phenylmethylsiloxane units, having a viscosity of 100 cs. Upon milling a grease was formed.

(d) To 100 parts by weight of a powdered silica having a surface area of 400 square meters per gram, there was added 18 parts of sym-triphenyltrimethylcyclotrisiloxane and one part orf ammonium carbonate. The mixture was rolled for one day at room temperature and allowed to stand for 2 more days, and then heated at 150° C. in a vacuum to remove all ammonia.

12.5 parts by weight of this treated filler were milled with 80 parts of a trimethylsiloxy endblocked dimethylpolysiloxane having a viscosity of 100 cs. at 25° C. and 2.8 parts of a methylpolysiloxane fluid having a 4.15 weight percent hydroxyl content. The product was a grease.

(e) 9.3 parts by weight of the treated silica of (d) above that had been heated immediately after the one day of rolling were milled with 87.9 parts of the siloxane copolymer of (c) above and 2.8 parts of diphenylsilanediol. A grease was formed.

(f) To 100 parts by weight of powdered silica having a surface area of 400 square meters per gram, there was added 15 parts of hexamethylcyclotrisiloxane and one part of ammonium carbonate. This was rolled for 24 hours at room temperature, and then heated at 150° C. to drive off all the ammonia.

To 15.9 parts by weight of this treated silica, there were added 81.2 parts of a trimethylsiloxy endblocked dimethylpolysiloxane fluid having a viscosity of 1000 cs. at 25° C. and 2.9 parts of a hydroxylated dimethylpolysiloxane fluid having a 3.9 weight percent hydroxyl content.

The above greases, which were within the scope of the claims of this application, were tested as in Example 1.

| Grease | Penetration | | Penetration after 24 hrs. at 400° F. | | Bleed after 30 hrs. at 400° F. (percent) | Evaporation after 22 hrs. at 400° F. (percent) |
|---|---|---|---|---|---|---|
| | Unworked | Worked | Unworked | Worked | | |
| (a) | 242 | 275 | 230 | 313 | 1.48 | 1.53 |
| (b) | 252 | 275 | 230 | 297 | 2.23 | 2.74 |
| (c) | 260 | 267 | 242 | 294 | 7.55 | 1.00 |
| (d) | 301 | 346 | 238 | 368 | 5.86 | 4.57 |
| (e) | 338 | 387 | 313 | 353 | 14.5 | 2.97 |
| (f) | 272 | 279 | 193 | 331 | not measured | not measured |

*Example 4*

When 100 parts by weight of (a) an organopolysiloxane fluid consisting essentially of 75 mol percent of dimethylsiloxane units, 20 mol percent of cyclohexylmethylsiloxane units, and 5 mol percent of dibromophenylmethylsiloxane units, having a viscosity of 20,000 cs. at 25° C., are milled with (b) 7 parts of silica having a surface area of 400 square meters per gram, (c) 1 part of tris - 3,3,3-trifluoropropyltrimethylcyclotrisiloxane, (d) 5 parts of a fluid 3,3,3-trifluoropropylmethylpolysiloxane having a 3 weight percent hydroxyl content, and (e) 0.5 part of concentrated ammonium hydroxide, a stable grease is formed.

*Example 5*

When 100 parts by weight of (a) an organopolysiloxane fluid consisting of 95 mol percent of dimethylsiloxane units and 5 mol percent of chlorophenylmethylsiloxane units, having a viscosity of 1500 cs. at 25° C., are milled with (b) 10 parts by weight of silica having a surface area of 100 square meters per gram, (c) 1 part of trihexyltrimethylcyclotrisiloxane, (d) 1 part of a fluid propylphenylpolysiloxane having a 3 weight percent hydroxyl content, and (e) 2 parts of n-propylamine, a stable grease is formed.

*Example 6*

When 100 parts by weight of (a) an equal weight blend of copolymers of 10 mol percent of diphenylsiloxane and 90 mol percent of dimethylsiloxane having viscosities of 20,000 cs. and 1,000 cs. respectively, measured at 25° C., (b) 10 parts of the treated silica filler of Example 3(d), and (c) 1 part of a fluid 2-phenylpropylmethylpolysiloxane having a 3.5 weight percent hydroxyl content are milled, a stable grease is formed.

*Example 7*

(a) To 20 parts by weight of a powdered silica having a surface area of about 400 square meters per gram, there was added (1) 300 parts of chlorothene,
(2) 2 parts of a mixture consisting of 80 weight percent of a phenylmethylsiloxane fluid having approximately a 6 weight percent hydroxyl content, 12.5 percent of sym-trimethyltriphenylcyclotrisiloxane, and 7.5 percent of other cyclic and linear phenylmethylsiloxane impurities, and
(3) 2 parts of hexamethyldisilazane.

This was mixed and then heated at 150° C. with agitation for one-half hour under a vacuum, resulting in a hydrophobic silica.

To the resulting product there was added (4) 135 parts by weight of a trimethylsiloxy-endblocked copolymer of 92.5 mol percent dimethylsiloxane units and 7.5 mol percent phenylmethylsiloxane units, having a viscosity of 100 cs. at 25° C., and another portion of ingredient (2), the same amount as added above,
(5) 1.5 parts of phenylmethylpolysiloxane fluid and purple dye color additives,
(6) 0.2 parts of a corrosion inhibitor.

This was milled until a grease was formed.

(b) To 21 parts by weight of a powdered silica having a surface area of about 200 square meters per gram and having one part of water added thereto, there was added (1) 300 parts of chlorothene,
(2) A total of 3 parts of the mixture of ingredient (2) in experiment (a) above, and
(3) 15 parts of hexamethyldisilazane.

This composition was mixed and heated as in (a) above, creating a hydrophobic silica, and 115 parts by weight of the similar organopolysiloxane copolymer as in (a) above, having a viscosity of 50 cs. at 25° C., was added with stirring and milling along with the same amounts of ingredients (5) and (6) as above, until a grease was formed.

The properties of the two greases were tested as in Example 1:

| Grease | Penetration | | Penetration after 72 hrs. at 200° C. | | Evap. after 22 hrs. at 400° F. (percent) | Bleed after 30 hrs. at 450° F. (percent) | Bearing life (hours) |
| --- | --- | --- | --- | --- | --- | --- | --- |
| | Unworked | Worked | Unworked | Worked | | | |
| (a) | 238 | 272 | 252 | 309 | 1.03 | 5.14 | 639 |
| (b) | 242 | 256 | 219 | 286 | 2.15 | 5.82 | Over 800 |

*Example 8*

The following compositions were prepared:

| Composition | Silica having surface area of 400 m.²/g. | Chlorothene | Ingredient (2) of Example 7(a) | 3 pts. by wt. of the following silazane |
| --- | --- | --- | --- | --- |
| (a) | 20 pts. by wt. | 300 pts. by wt. | 3 pts. by wt. | $\left[\begin{array}{c} CH_3 \\ CH_2{=}CHSi \\ CH_3 \end{array}\right]_2 NH$ |
| (b) | 20 pts. by wt. | 300 pts. by wt. | 3 pts. by wt. | $\left[\begin{array}{c} CH_3 \\ CF_3CH_2CH_2Si \\ CH_3 \end{array}\right]_2 NH$ |
| (c) | 20 pts. by wt. | 300 pts. by wt. | 3 pts. by wt. | 13 wt. percent of: $\left[(C_6H_5)_2 Si\!-\!CH_3\right]_2 NH$ <br> 84 wt. percent of: $\left[\begin{array}{c} CH_3 \\ C_6H_5\!-\!Si \\ CH_3 \end{array}\right]_2 NH$ <br> 3 wt. percent of hexane. |

These compositions were each mixed and heated as in Example 7(a), resulting in a hydrophobic silica, and to each there was added the trimethylsiloxy-endblocked copolymer of Example 7(a), to compositions (a) there was added 115 parts by weight; to composition (b) 130 parts; and to composition (c) 145 parts. The same amounts of ingredients (5) and (6) as in Example 7 were also added to each composition. Upon milling, a grease was formed in each case.

The properties of each of these greases were tested as in Example 1:

| Composition | Penetration | | Penetration after 72 hrs. at 200° C. | | Bleed after 30 hrs. at 450° F. (percent) | Evap. after 22 hrs. at 400° F. (percent) |
|---|---|---|---|---|---|---|
| | Unworked | Worked | Unworked | Worked | | |
| (a) | 245 | 283 | 242 | 297 | 5.13 | 1.02 |
| (b) | 252 | 286 | 227 | 301 | 3.76 | 1.17 |
| (c) | 245 | 275 | 227 | 290 | 7.44 | 1.30 |

Example 9

When 100 parts of tolyldimethyl-endblocked phenylmethylpolysiloxane having a viscosity of 5000 cs. at 25° C. are milled with (a) 10 g. of a silica powder having a surface area of about 300 m.²/g. and which has been rendered hydrophobic by treatment with 2 g. of octamethylcyclotetrasilazane and (b) 2 g. of

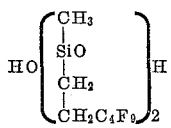

a mechanically and thermally stable grease which is suitable for use in a high-speed bearing results.

Example 10

To about 10.5 parts by weight of silica having a surface area in excess of 100 square meters per gram there was added about 1 part of phenyldimethylsilylamine. This was shaken for a few minutes until the silica was rendered hydrophobic.

This hydrophobic silica was then milled into 86.4 parts by weight of a trimethylsiloxy-endblocked copolymer of 92.5 mol percent dimethylsiloxane units and 7.5 mol percent phenylmethylsiloxane units, having a viscosity of 200 cs. at 25° C., plus 3.1 parts of

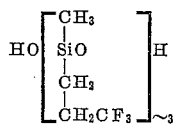

The product was a grease having the following properties, measured as in Example 1.

Penetration:
    Unworked _____ 267
    Worked _____ 279

Penetration after 24 hrs. at 200° C.:
    Unworked _____ 219
    Worked _____ 275

Bleed after 30 hrs. at 450° F. (percent) _____ 5.83
Evap. after 22 hrs. at 400° F. (percent) _____ 2.30

Example 11

To about 9.6 parts by weight of a silica having a surface area in excess of 100 square meters per gram, there was added about 1 part of phenylmethyldimethoxysilane. This was rolled at 100° C. until a hydrophobic silica resulted.

This hydrophobic silica was then milled into 89.4 parts by weight of the siloxane copolymer of Example 7(a) plus 1 part of the mixture of ingredient (2) of Example 7(a).

The product was a grease having the following properties, measured as in Example 1.

Penetration:
    Unworked _____ 283
    Worked _____ 297

Penetration after 72 hrs. at 200° C.:
    Unworked _____ 212
    Worked _____ 272

Bleed after 30 hrs. at 450° F. (percent) _____ 6.26
Evap. after 22 hrs. at 400° F. (percent) _____ 2.89

Example 12

When 20 g. of finely divided silica having a surface area of 300 m.²/g. are treated with 2 g. of any of the following hydrophobing agents so as to render the silica hydrophobic, and the treated silica is milled with 200 g. of

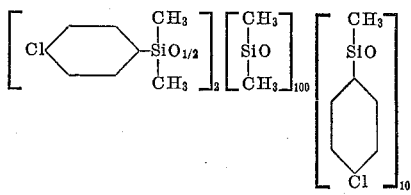

and 10 g. of

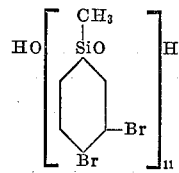

greases which are suitable as high speed bearing greases result:

(a) $(CH_3)_3SiCl$ (b) $(C_6H_{13})_3SiOC_2H_5$, plus a trace of dibutyltindilaurate (c) 

(d) 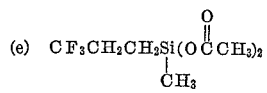

(e) $CF_3CH_2CH_2Si(O\overset{O}{\underset{\|}{C}}CH_3)_2$
                    $\overset{|}{CH_3}$ (f) $(CH_3)_3SiOH$ plus 0.1g. of dibutylamine (g) 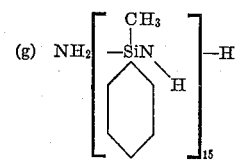

Example 13

To 92.5 parts by weight of a trimethylsiloxy-endblocked copolymer of 92.5 mol percent dimethylsiloxane units and 7.5 mol percent phenylmethylsiloxane units having a viscosity of 1000 cs. at 25° C., there was added 5.5 parts of a finely-divided silica which was reacted with more than 2 percent of its weight of trimethylchlorosilane, rendering it hydrophobic, and 2 parts of a fluid dimethylpolysiloxane which had a hydroxyl content of 3.8 weight percent.

This was milled into a grease which was tested as in Example 1:

Penetration after heating 2¼ hours at 550° F.:
Unworked _____ 219
Worked _____ 234

The unworked and worked penetrations before heating were in the vicinity of 290.

The same formulation, absent the hydroxylated dimethylpolysiloxane, had an unmeasurable unworked penetration after heating for 2¼ hours at 550° F., the grease being lumpy and hard.

*Example 14*

To 14.0 parts by weight of a powdered silica having a surface area of about 400 square meters per gram, as determined by known techniques of adsorption of nitrogen, there was added 2.1 parts of

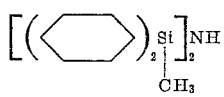

This was shaken until it was hydrophobic, and then it was milled with 80.7 parts by weight of a diphenylmethylsiloxane-endblocked phenylmethylpolysiloxane having a viscosity at 25° C. of 600 cs., and 3.2 parts of a dimethylpolysiloxane having a hydroxyl content of 3.2 weight percent.

The product was a grease having the following properties, as tested in Example 1:

Bleed after 30 hrs. at 450° F. _____percent__ 1.98
Evaporation after 22 hrs. at 400° F. _____do____ 2.10
Penetration before heating:
Unworked _____ 249
Worked _____ 331
Penetration after 72 hrs. at 400° F.:
Unworked _____ 189
Worked _____ 309

*Example 15*

To 30 g. of a finely-divided silica having a surface area of about 400 m.²/g., there was added 8 g. of a hydroxyl-endblocked dimethylpolysiloxane having a 3.5 weight percent hydroxyl content, 4 g. of ammonium carbonate, and 400 g. of chlorothene.

This was stripped and heated for 1½ hours at 150° C.

The mixture was then milled with 200 g. of the trimethylsiloxy-endblocked copolymer of Example 1, and 8 g. of the mixture of ingredient (2) of Example 7(a).

The product was a grease having properties determined as in Example 1:

Penetration:
Unworked _____ 301
Worked _____ 357
Penetration after 72 hrs. at 400° F.:
Unworked _____ 208
Worked _____ 368
Bleed after 30 hrs. at 450° F. _____percent__ 2.32
Evap. after 22 hrs. at 400° F. _____do____ 1.53

The grease was subjected to the bearing test of Example 1, and lasted for 631 hours.

*Example 16*

A blend of 60 parts by weight of dimethylpolysiloxane having a viscosity of 30,000 cs. at 25° C. plus 36 parts of a dimethylpolysiloxane having a viscosity of 500 cs. at 25° C. (the blend having a viscosity of about 5000 cs. at the same temperature) was mixed with 4 parts of the mixture of ingredient (2) of Example 7(a) and 8 parts of powdered silica having a surface area of about 200 m.²/g.

The mixture was heated in a vacuum oven for 2 hours at 150° C. to form a grease having an unworked penetration of 204, a worked penetration of 242, and, after 24 hours at 200° C., no bleed and 1.28 weight percent of evaporation, determined as in Example 1.

The product was an excellent lubricating compound, being long-lasting and stable in the presence of pressurized steam.

That which is claimed is:

1. A grease consisting essentially of
  (a) 100 parts by weight of an organopolysiloxane fluid of the average unit formula $R_nSiO_{4-n/2}$ where R is selected from the group consisting of monovalent hydrocarbon and haloaryl radicals of no more than 7 carbon atoms and free of aliphatic unsaturation, $n$ has an average value of 1.9 to 2.1, the viscosity of (a) being from 20 to 30,000 cs. at 25° C.;
  (b) from 5 to 25 parts of a powdered silica filler having a surface area of at least 100 square meters per gram, which filler is rendered hydrophobic by treatment with
  (c) from 2 to 150 weight percent, based on the weight of (b), of a compound selected from the group consisting of cyclic polysiloxanes of the formula $(R'_2SiO)_3$, at least 50 mol percent of said R' groups being methyl; silazanes of the formula $$(R'_3Si)_aNH_{3-a}$$

where $a$ has a value of 1 to 2; polysilazanes of the unit formula

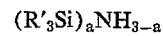

which have a viscosity of no more than 200 cs. and silanes of the formula $R'_bSiX_{4-b}$, where X is chlorine, bromine, lower alkoxy, lower acyloxy, or hydroxyl, $b$ has a value of 2 to 3, and R' is in all cases as defined below; and
  (d) from 5 to 100 weight percent, based on the weight of (b), of a hydroxylated organopolysiloxane fluid containing an average of 1.8 to 2.1 R' groups per silicon atom, where R' is selected from the group consisting of hydrocarbon and halohydrocarbon radicals of no more than 7 carbon atoms, having a silicon-bonded hydroxyl content of at least 1 weight percent.

2. The grease of claim 1 where the R groups of ingredient (a) are from 2 to 15 mol percent phenyl and from 85 to 98 mol percent methyl.

3. The grease of claim 1 where ingredient (a) is essentially dimethylpolysiloxane.

4. The grease of claim 1 where ingredient (c) is hexamethyldisilazane.

5. The grease of claim 1 where ingredient (d) consists essentially of a hydroxylated phenylmethylpolysiloxane.

6. The grease of claim 1 where (a) has a viscosity of from 50 to 1500 cs. at 25° C.

7. A grease consisting essentially of
  (a) 100 parts by weight of an organopolysiloxane fluid of the average unit formula $R_nSiO_{4-n/2}$, where R is selected from the group consisting of monovalent hydrocarbon and halohydrocarbon radicals of no more than 7 carbon atoms, free of aliphatic unsaturation, at least 85 percent of said R groups being methyl, and $n$ has an average value of 1.95 to 2.1, the viscosity of (a) being from 20 to 15,000 cs. at 25° C.; from 5 to 25 parts of
(b) a powdered silica filler having a surface area of at least 100 square meters per gram; from 2 to 35 weight percent, based on the weight of (b), of
(c) a cyclic siloxane of the formula $(R_2SiO)_3$, at least 50 mol percent of said R groups being methyl; and from 5 to 100 weight percent, based on the weight of (b), of
(d) a hydroxylated organopolysiloxane containing an average of 1.8 to 2.1 R groups per silicon atom, R being defined above, and a silicon-bonded hydroxyl content of at least 2 weight percent.

8. The grease of claim 7 where (c) is symtriphenyltrimethylcyclotrisiloxane.

9. The grease of claim 1 where (d) is incompatible with (a).

References Cited
UNITED STATES PATENTS

| | | | |
|---|---|---|---|
| 2,951,862 | 9/1960 | Pierce | 252—49.6 |
| 2,985,679 | 5/1961 | Pepe | 252—49.6 |
| 3,045,036 | 7/1962 | Jex et al. | 252—49.6 |
| 3,061,545 | 10/1962 | Badger | 252—49.6 |
| 3,112,332 | 11/1963 | Pike | 252—49.6 |
| 3,145,175 | 8/1964 | Wright | 252—49.6 |
| 3,145,225 | 8/1964 | Brown | 252—49.6 |
| 3,171,851 | 3/1965 | Pepe | 252—49.6 |
| 3,174,987 | 3/1965 | Simmler et al. | 252—49.6 |
| 3,192,157 | 6/1965 | Gowdy | 252—49.6 |
| 3,278,435 | 10/1966 | Kawahora | 252—49.6 |

DANIEL E. WYMAN, *Primary Examiner.*

I. VAUGHN, *Assistant Examiner.*